United States Patent [19]
Brigida et al.

[11] Patent Number: 5,528,626
[45] Date of Patent: Jun. 18, 1996

[54] METHOD AND SYSTEM FOR MODEM COMMAND PROCESSING DURING DATA TRANSFER

[75] Inventors: David J. Brigida, Boca Raton; Victor S. Moore, Delray Beach; Thomas K. Pate, Boca Raton, all of Fla.

[73] Assignee: International Business Machines Corporation, Armonk, N.Y.

[21] Appl. No.: 860,383

[22] Filed: Mar. 30, 1992

[51] Int. Cl.$^6$ ................................................ H04B 1/38
[52] U.S. Cl. .......................... 375/222; 375/377; 379/98
[58] Field of Search ...................... 375/8, 9, 121; 379/93, 98, 97; 370/110.4, 111, 118

[56] References Cited

U.S. PATENT DOCUMENTS

| | | | |
|---|---|---|---|
| 3,825,905 | 7/1974 | Allen, Jr. | 375/11 X |
| 4,387,440 | 6/1983 | Eaton | 375/8 |
| 4,549,302 | 10/1985 | Heatherington | 375/8 |
| 4,718,082 | 1/1988 | Parker et al. | 375/8 |
| 4,922,534 | 5/1990 | Gorniak et al. | 375/8 |
| 4,926,448 | 5/1990 | Kraul et al. | 375/121 |
| 4,928,305 | 5/1990 | Yui | 375/8 |
| 4,972,507 | 11/1990 | Lusignan | 455/51 |
| 5,170,470 | 12/1992 | Pindar et al. | 375/8 |

OTHER PUBLICATIONS

IEEE Transactions on Communications, vol. 28 No. 4, Apr. 1980, Fouad A. Tobagi "Multiaccess Protocols in Packet Communication Systems" pp. 468–488.

INSPEC, Fifth International Conference on Radio Receivers and Associated Systems (Conf. Pub. No. 325) "A Cellular Packet Radio Network" M. C. Davie et al. pp 187–191.

*Primary Examiner*—Stephen Chin
*Assistant Examiner*—T. Ghebretinsae
*Attorney, Agent, or Firm*—Ray Strimaitis; Andrew J. Dillon

[57] ABSTRACT

A method and system are disclosed for permitting selected command sequences to be processed by a modem during data transfer operations. A preselected escape character is designated and inserted into a data stream to be applied to a modem in order to identify a selected command sequence which follows. A termination character is inserted into the data stream following the selected command sequence. Upon detection of the preselected escape character, the selected command sequence is coupled to a command processor within the modem and processed. In applications in which the modem is coupled between a data processing system and a cellular telephone communication channel, the selected command sequence may be utilized to transmit communication channel parameter status queries to a cellular telephone associated with the modem. In this manner, the Received Signal Strength Indicator (RSSI), bit error rate, or other indications of communication channel status may be queried. An identical technique may be utilized to transmit a response to each such query to the data processing system, permitting real time display of cellular communication channel status information during data transfer.

7 Claims, 4 Drawing Sheets

METHOD AND SYSTEM FOR MODEM COMMAND PROCESSING DURING DATA TRANSFER

BACKGROUND OF THE INVENTION

1. Technical Field

The present invention relates in general to improvements in communication in a distributed data processing system and in particular to methods and systems for enhancing the efficiency of modem operation in a data processing system. Still more particularly, the present invention relates to methods and systems for permitting command processing by a modem during data transfer, wherein communication channel parameters may be monitored.

2. Description of the Related Art

Data communication between modern computer devices is typically accomplished utilizing a modulator/demodulator or so-called "modem" which is utilized to convert digital signals within a data processing system to analog signals for transmittal over existing communication links. Additionally, such devices convert received analog signals to digital signals for utilization by a data processing system. In the past most distributed computer networks have been coupled together utilizing existing telephone land line systems or specialized wiring; however, modern distributed data processing systems often utilize more sophisticated means of communication.

For example, the decreasing cost of cellular communication equipment has resulted in the utilization of that technology to couple together computers without the necessity of access to a telephone line outlet. This particular technology is particularly effective in combination with small portable battery powered laptop or notebook computers in which the necessary modem and cellular communication circuitry are miniaturized and provided in an integral fashion within the computer itself. Thus, an operator utilizing such a computer may initiate communications and transfer data between his or her computer and a distributed data processing system without the necessity of access to either telephone lines or power lines. Examples of such portable computers include the International Business Machines Corporation LX40 and the Model 9075 PCradio, which may be utilized for wireless communication by attaching a radio device. Radio devices such as a cellular telephone, or ARDIS radio devices may be utilized.

These radio devices communicate with the portable computer via a conventional communication port. These devices are typically configured and controlled in the same manner as a Hayes compatible modem. For example, a series of preselected commands, typically known as "AT" commands may be utilized to set internal parameters for these devices and instruct the devices in operation. Known modems or combination modem/radio systems typically operate in one of two different modes of operation. In a first mode of operation, the device recognizes all characters transmitted to the device as commands. This mode of operation is referred to as the command mode. The other mode treats characters received at the device as data to be transmitted via a communications link. This mode of operation is referred to as the data mode. Typically, a special sequence of data bytes may be utilized to toggle the device from the data mode to the command mode. Generally this sequence consists of one second with no data followed by the key sequence "+++," followed by another second of no data.

This manner of transferring back and forth between command and data modes of operation has proven to be quite adequate for devices which communicate via telephone landlines. Such devices have been widely accepted within the industry. This toggling concept works largely because the command mode and data mode are substantially divorced from one another, without the need to share data from one mode with the second mode. This is generally due to the low bit error rates present within landline systems and the fact that a standard modem has little information to provide to the data processing system regarding modem or line operation while the modem is operating in a data mode. In contrast, modem/radio systems possess substantial amounts of information regarding the modem and communications channel operation.

For example, when utilizing a cellular telephone/modem to transmit data it would be helpful to the operator to possess information regarding how well the cellular telephone radio link is operating at a particular moment. This information may be utilized by the operator to make decisions regarding data throughput. If data throughput is low, the operator may choose to select a different transmission protocol or to increase the power of the radio transmitter. For example, a low Received Signal Strength Indicator (RSSI) may alert the operator to increase the transmitter power so that the receiving station may receive a clear signal. The Received Signal Strength Indicator (RSSI) and a Service Access Tone (SAT) are two indications of cellular telephone channel quality which are typically present within a known cellular telephone system. Additionally, information about the bit error rate experienced within the cellular telephone transmission channel may also be utilized by the operator to choose protocols that enhance the efficiency of data transfer.

While existing cellular telephone systems may provide channel information, such as Received Signal Strength Indicator (RSSI), Service Access Tone (SAT), bit error rates and packet counts, these important operational parameters are not generally available to data radio operators during data transmission. In order to access this information utilizing known data radio devices, the data transmission mode must be terminated and the operator must enter the command mode in order to query the status of these various parameters.

It should therefore be apparent that a need exists for a method and system whereby modem commands may be selectively processed during data transfer, resulting in the ability to poll communication channel parameters during actual data transfer.

SUMMARY OF THE INVENTION

It is therefore one object of the present invention to provide an improved system for communication in a distributed data processing system.

It is another object of the present invention to provide an improved method and system for enhancing the efficiency of modem operation in a distributed data processing system.

It is yet another object of the present invention to provide an improved method and system for permitting selected command processing by a modem during data transfer wherein communication channel parameters may be monitored during modem operation.

The foregoing objects are achieved as is now described. The method and system of the present invention may be utilized to permit selected command sequences to be processed by a modem during data transfer operations. A preselected escape character is designated and inserted into a data stream to be applied to a modem in order to identify a selected command sequence which follows. A termination character is inserted into the data stream following the selected command sequence. Upon detection of the preselected escape character, the selected command sequence is coupled to a command processor within the modem and processed. In applications in which the modem is coupled between a data processing system and a cellular telephone communication channel, the selected command sequence may be utilized to transmit communication channel parameter status queries to a cellular telephone associated with the modem. In this manner, the Received Signal Strength Indicator (RSSI), bit error rate, or other indications of communication channel status may be queried. An identical technique may be utilized to transmit a response to each such query to the data processing system, permitting real time display of cellular communication channel status information during data transfer.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
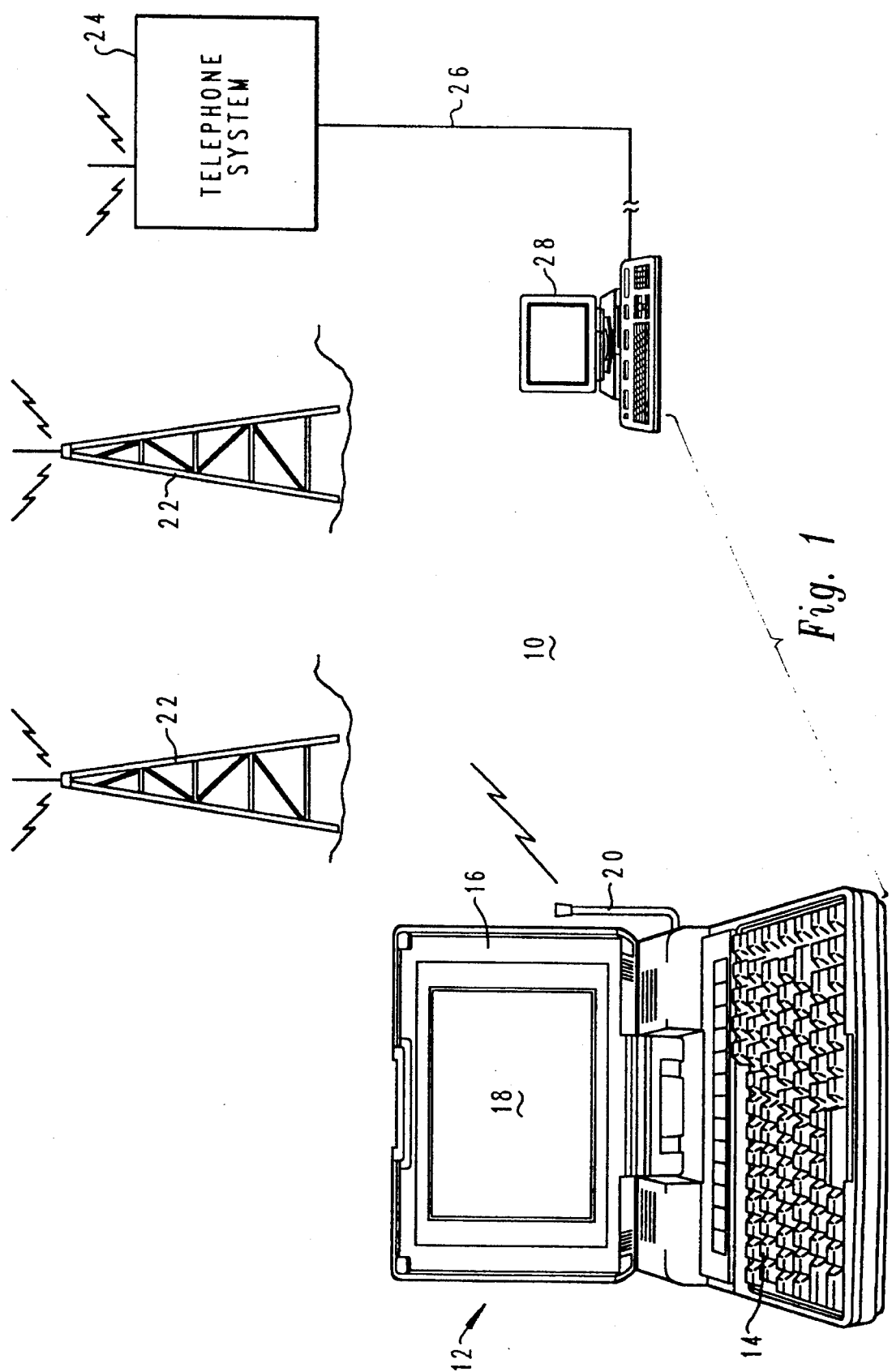
FIG. 1 is a partially schematic pictorial representation of a distributed data processing system which may be utilized to implement the method and system of the present invention.

With reference now to the figures and in particular with reference to FIG. 1, there is depicted a partially schematic pictorial representation of a distributed data processing system 10 which may be utilized to implement the method and system of the present invention. Upon reference to the foregoing those skilled in the art will appreciate that while distributed data processing system 10 is illustrated as including only two computers, typically such distributed data processing systems include a large number of computers distributed over a wide geographic area. As illustrated, one of the computers within distributed data processing system 10 is a portable computer 12. Portable computer 12 is typically a battery powered computer which includes a low power display system 16 which preferably provides a display screen 18 which may be implemented utilizing a liquid crystal displays (LCDS), a gas plasma display or any other suitable technology. The keyboard 14 is provided which enables the user to access and modify data stored within portable computer 12 in a manner well known in the art.

As those skilled in the art will appreciate it is increasingly common for computers such as portable computer 12 to include therein a miniature cellular telephone system (not shown) which is provided in conjunction with a modem. One example of a portable computer equipped with a combination modem/cellular telephone which may be utilized to implement portable computer 12 is the International Business Machines Corporation Model 9075 PCradio. Those skilled in the art will appreciate that a modem is a device which may be utilized to convert digital data from a computer to an analog signal which may be transmitted via a telecommunications system. Additionally, such devices convert received analog signals from the telecommunications line to digital data which may be utilized by a computer. As is typical in such systems, a cellular telephone transmits a radio frequency signal via antenna 20 which may be received and relayed via multiple cellular system antennae 22. Thus, digital data within portable computer 12 may be converted into a series of analog signals and transmitted, via a cellular telephone system and multiple intervening repeaters to a telephone system 24, in a manner well known to those skilled in this art.

Analog signals thus transmitted may be received by the telephone system and transmitted, via an ordinary telephone land line 26 to a computer 28 within distributed data processing system 10. While computer 28 is depicted as a personal computer, those skilled in the art will appreciate that computer 28 may be implemented utilizing a workstation, terminal or mainframe computer, as desired. Typically, computer 28 will also include a modem device permitting data from portable computer 12 to be transmitted to and received by computer 28 and computer 28 may also be linked to portable computer 12 utilizing cellular technology, rather than telephone land lines.

Figure 2:
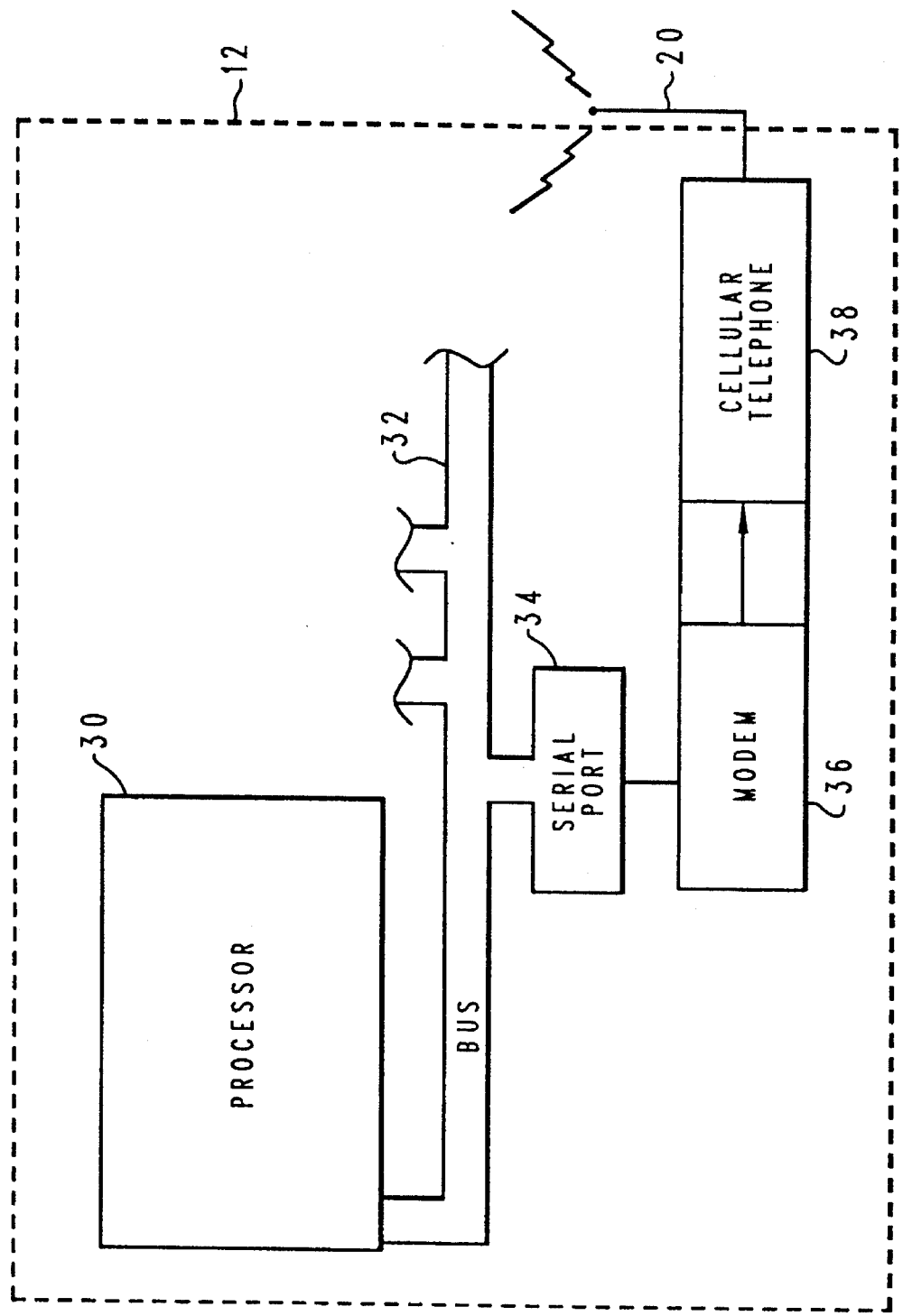
FIG. 2 is a partial high level block diagram of a computer within the distributed data processing system of FIG. 1 which may be utilized to implement the method and system of the present invention.

Referring now to FIG. 2, there is depicted a partial high level block diagram of portable computer 12 within distributed data processing system 10 of FIG. 1 which may be utilized to implement the method and system of the present invention. As illustrated, portable computer 12 preferably includes a processor 30 which is coupled to a bus 32. Serial port 34, coupled to bus 32, is utilized to serialize data from processor 30 and couple that data to modem 36. Modem 36, as described above, converts that data into a series of analog signals which are coupled to cellular telephone 38 and transmitted, via antenna 30 in the manner described above. Of course, those skilled in the art will appreciate that in a modern miniature portable computer modem 36 and cellular telephone 38 may be implemented utilizing a single subassembly within portable computer 12.

Figure 3:
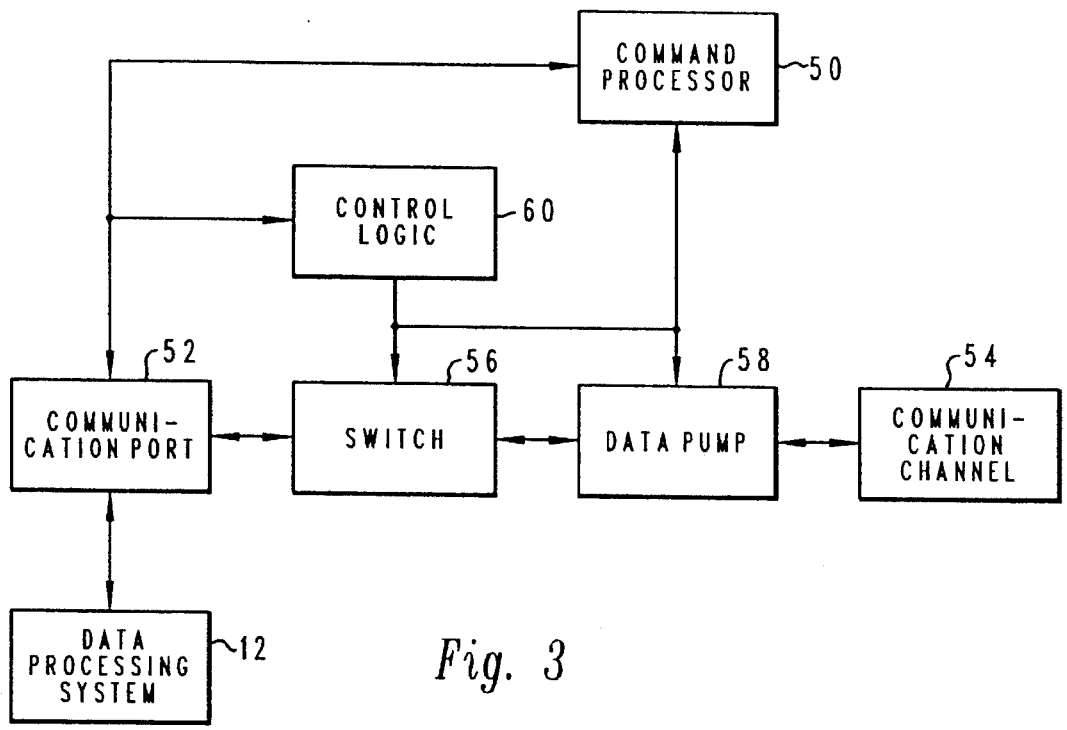
FIG. 3 is a high level block diagram of a modem/cellular telephone which may be utilized to implement the method and system of the present invention.

With reference now to FIG. 3, there is depicted a high level block diagram of a modem/cellular telephone which may be utilized to implement the method and system of the present invention. As is typical in such devices, the modem is coupled via communication port 52 to data processing system 12. In known combination modem/cellular telephone systems of this type, the digital data from the data processing system is converted to an analog signal and coupled to communication channel 54 via data pump 58. In the depicted embodiment of the present invention two additional features, switch 56 and control logic 60 are provided. In accordance with the method and system of the present invention, switch 56 and control logic 60 are utilized to temporarily divert data within a data stream applied to the modem to the command processor 50. Command processor 50 is, as those skilled in the art will appreciate, typically present within each modem and utilized to decode and process the various commands which may be coupled to the modem while the modem is operating in the command mode.

As will be explained in greater detail herein, the method and system of the present invention selectively inserts a designated escape character into the data stream being coupled through the modem and, upon a detection of this designated escape character by control logic 60, switch 56 is utilized to couple the characters which follow the designated escape character to command processor 50, allowing the modem to process selected commands while maintaining operation in the data transfer mode. In a similar manner, as will be explained in greater detail herein, command processor 50 may also transmit responses to selected commands to data processing system 12 by inserting into the data stream passing through the modem a response to a selected command following a designated escape character, indicating that the data which follows is not part of the normal data stream. In this manner, a data processing system may transmit selected command sequences to the command processor of the modem without breaking away from the data transfer mode. These command sequences may then be processed and requested data may be returned to the data processing system via communication port 52, by inserting the response data into the data stream utilizing the designated escape character to isolate the response data from received data being transmitted to data processing system 12.

Of course, those skilled in the art will appreciate that this method and system will not find application with all possible commands in the command set utilized for a typical modem; however, selected command sequences, as will be described in detail below, may be utilized to permit the operator to receive certain communication channel parameter information in a real time basis, without requiring the operator to toggle the modem from the data transfer mode to the command mode. As will be illustrated below, examples of various communication channel parameters such as cellular signal strength, Service Access Tone (SAT) frequency, cellular channel, packet number, number of packet retries, retraining status and data buffer utilization may all be obtained from the modem utilizing the method and system of the present invention.

Figure 4:
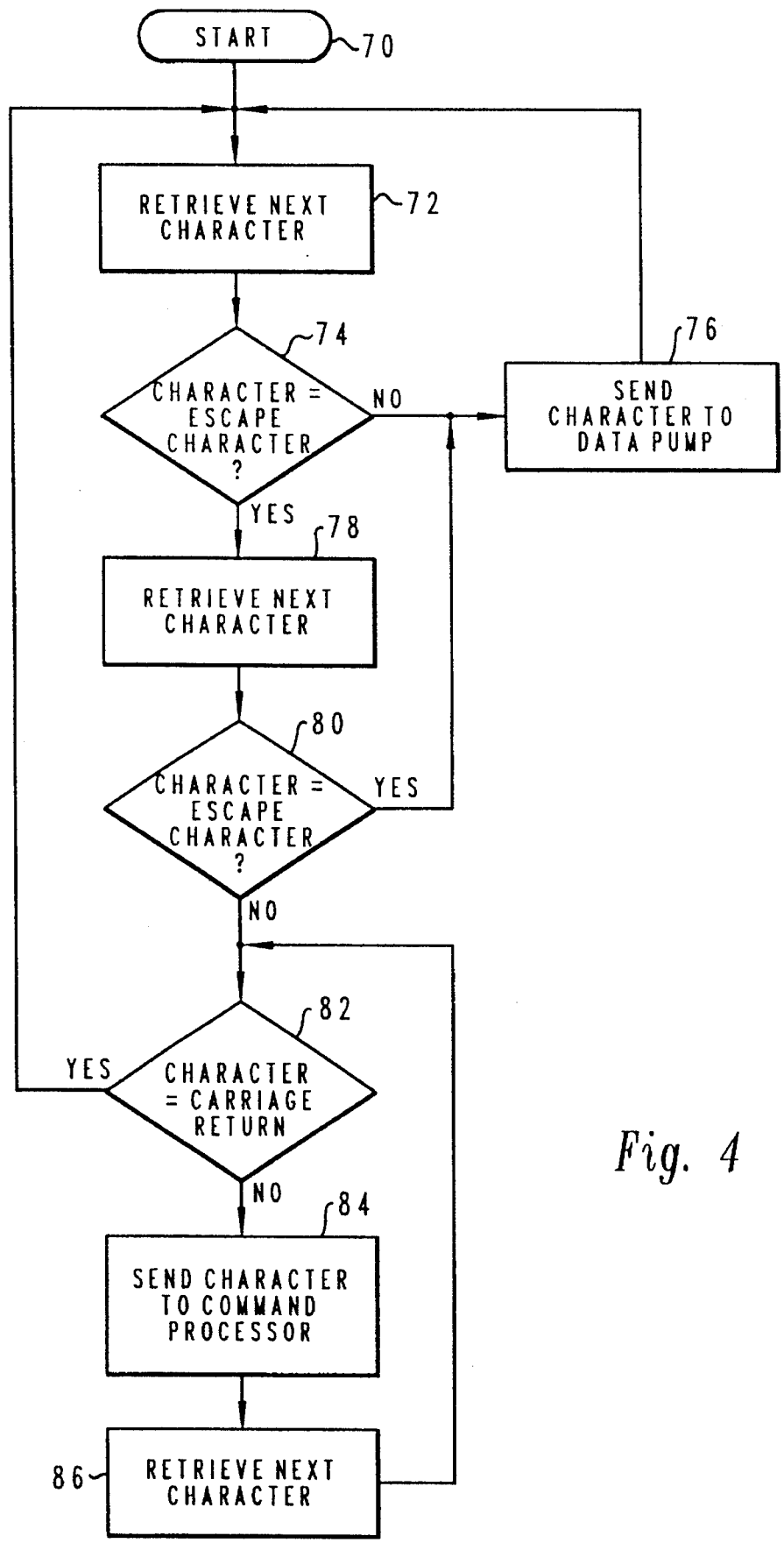
FIG. 4 is a high level logic flowchart which depicts command processing in a modem during data transfer in accordance with the method and system of the present invention.

Referring now to FIG. 4, there is depicted a high level flowchart which illustrates the processing of commands by a modem during data transfer, in accordance with the method and system of the present invention. Of course, the process depicted within FIG. 4 illustrates a data stream flowing from the data processing system to the communication channel; however, the identical process may be utilized to embed responses to selected command sequences in a data stream flowing from the communication channel to the data processing system.

The process, as illustrated, begins at block 70 and thereafter passes to block 72. Block 72 illustrates the retrieval of the next character within the data stream and the process then passes to block 74. Block 74 depicts a determination of whether or not the character retrieved is the designated escape character. As will become apparent to those skilled in the art upon reference to the foregoing, the designated escape character may be any character within the data processing system; however, the efficiency of the system will be greatly enhanced by selecting an escape character which is not often present within normal data stream transfers. For example, the "escape" key may be utilized. It is anticipated that a selected AT command may be utilized to place the modem/cellular telephone system into a shared command/data state of operation and that a second command may thereafter be utilized to designate a selected escape character for utilization with the method and system of the present invention.

Referring again to block 74, in the event the character just retrieved is not the designated escape character, the process passes to block 76. Block 76 illustrates the transmittal of that character to the data pump for transmittal via the modem/cellular telephone system. However, in the event the character encountered is the designated escape character, as determined at block 74, the process passes to block 78.

Block 78 illustrates the retrieval of the next character and thereafter, the process passes to block 80. Block 80 depicts a determination of whether or not the next character retrieved is the designated escape character. This step in the process is utilized, as should be apparent, to permit the transmittal of the designated escape character within an ordinary data stream context by searching out each occurrence of the designated escape character within the data stream which is not followed by a command sequence and inserting at that point a second occurrence of the designated escape character. Thus, the occurrence of two consecutive designated escape characters will indicate to the method and system of the present invention that a single escape character is to be transmitted to the data pump, as depicted at block 76 of FIG. 4.

Referring again to block 80, in the event the next character retrieved is not the designated escape character, the process passes to block 82. Block 82 illustrates a determination of whether or not the next character is the designated termination character. In the depicted embodiment of the present invention each command sequence which follows a designated escape character is terminated by utilizing a carriage return. However, any other unique character may be utilized to designate the termination of a command sequence which follows a designated escape character, in accordance with the method and system of the present invention. If the next character is a carriage return, the process passes back to block 72 to retrieve the next character and begin transmitting data via the data pump until the next designated escape character occurs.

Referring again to block 82, in the event the next character encountered is not a carriage return, or alternate designated termination character, the process passes to block 84. Block 84 illustrates the transmittal of that character to the command processor and the process then passes to block 86. Block 86 illustrates the retrieval of the next character and the process then returns iteratively to block 82 until such time as the designated termination character occurs. In this manner, data within a data stream applied to the modem is continually analyzed to locate a designated escape character within that data stream and thereafter, the subsequent character is checked to determine if a duplicate designated escape character has been transmitted. In the event a second designated escape character has not been transmitted, the data which follows the designated escape character is continuously coupled to the command processor until such time as the designated termination character (a carriage return in the depicted embodiment) occurs. In this manner, selected command sequences may be coupled to the command processor 50 (see FIG. 3) for processing without terminating the data transfer mode.

Figure 5:
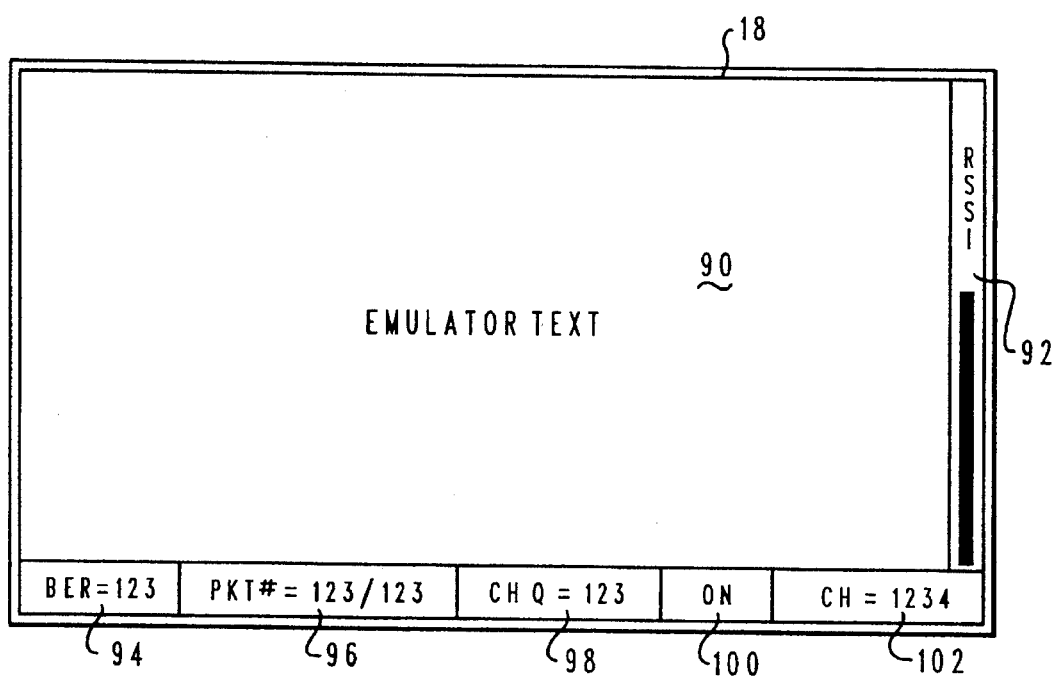
FIG. 5 is a pictorial representation of a computer display depicting the display of communication channel status data obtained utilizing the method and system of the present invention.

With reference now to FIG. 5, there is depicted a pictorial representation of a computer display 18 which depicts the display of communication status data obtained utilizing the method and system of the present invention. As illustrated, a window 90 is provided which may be utilized to display the text associated with the emulator application. Additionally, various communication channel status data may be displayed within computer display 18 in the manner illustrated within FIG. 5. For example, the Received Signal Strength Indicator (RSSI) may be obtained from the modem/cellular telephone assembly and be graphically depicted as illustrated at reference numeral 92, as a bar graph which varies in length according to the amplitude of the Received Signal Strength Indicator (RSSI) received from the cellular system. Additionally, various other communications channel parameters may be established by querying the command processor 50 (see FIG. 3) utilizing embedded command sequences in the manner described herein and subsequently returning the response to those command sequences to the data processing system for display. For example, a bit error rate may be displayed, as indicated at reference numeral 94. Additionally, various packet numbers, channel quality indicators, carrier status indicators and channel numbers may be displayed as depicted at reference numerals 96, 98, 100 and 102.

Upon reference to the foregoing those skilled in the art will appreciate that the Applicants herein have provided a novel and unobvious method whereby selected command sequences may be addressed to a command processor within a modem while that modem is in the data transfer mode, without requiring the modem to be toggled to the command mode. These command sequences may then be processed and a response to each command sequence may be embedded within the data being transferred to the data processing system in a similar manner. Thus, the user of a battery powered portable computer device having an integrated modem/cellular telephone communication capability may be continually apprised of the status of the communication channel, in real time, without the necessity of continually toggling the modem between the data transfer mode and the command mode.

While the invention has been particularly shown and described with reference to a preferred embodiment, it will be understood by those skilled in the art that various changes in form and detail may be made therein without departing from the spirit and scope of the invention.

We claim:

1. A method in a data processing system for monitoring communication channel parameters during transfer of data utilizing a modem coupled between said communication channel and said data processing system, said modem having a data transfer mode and a command mode, said method comprising the steps of:

coupling a stream of data from said data processing system to said modem while said modem is operating in said data transfer mode;

periodically inserting within said stream of data a preselected escape character followed by a selected communication channel parameter status query;

automatically processing each of said selected communication channel parameter status queries within said modem in response to a detection of said preselected escape character while said modem continues to operate in said data transfer mode; and transmitting a response to each of said selected communication channel parameter status queries from said modem to said data processing system in response to said processing thereof.

2. The method in a data processing system for monitoring communication channel parameters during transfer of data utilizing a modem according to claim 1, wherein said step of transmitting a response to each of said selected communication channel parameter status queries from said modem to said data processing system comprises the steps of:

coupling a second stream of data from said modem to said data processing system while said modem is operating in said data transfer mode; and selectively inserting within said second stream of data a preselected escape character followed by a response to a selected communication channel parameter status query.

3. The method in a data processing system for monitoring communication channel parameters during transfer of data utilizing a modem according to claim 2, wherein said data processing system includes a display device and wherein said method further includes the step of displaying said response to a selected communication channel parameter status query utilizing said display device.

4. The method in a data processing system for monitoring communication channel parameters during transfer of data utilizing a modem according to claim 1, further including the step of inserting within said stream of data a preselected termination character following each selected communication channel parameter status query.

5. A data processing system for monitoring communication channel parameters during transfer of data utilizing a modem coupled between said communication channel and said data processing system, said modem having a data transfer mode and a command mode, said data processing system comprising:

means for coupling a stream of data from said data processing system to said modem while said modem is operating in said data transfer mode;

means for periodically inserting within said stream of data a preselected escape character followed by a selected communication channel parameter status query;

means for automatically processing each of said selected communication channel parameter status queries within said modem in response to a detection of said preselected escape character while said modem continues to operate in said data transfer mode; and means for transmitting a response to each of said selected communication channel parameter status queries from said modem to said data processing system in response to said processing thereof.

6. The data processing system for monitoring communication channel parameters during transfer of data utilizing a modem according to claim 5, wherein said communication channel comprises a cellular telephone communication channel and wherein at least one of said selected communication channel parameter status queries comprises a query of Received Signal Strength Indicator from said cellular telephone communication channel.

7. The data processing system for monitoring communication channel parameters during transfer of data utilizing a modem according to claim 5, wherein said communication channel comprises a cellular telephone communication channel and wherein at least one of said selected communication channel parameter status queries comprises a query of bit error rate from said cellular telephone communication channel.

* * * * *